United States Patent [19]
Better et al.

[11] 3,722,312
[45] Mar. 27, 1973

[54] METHOD AND NUT FOR PRELOADING BALL SCREW ASSEMBLIES AND METHOD OF MANUFACTURE OF THE PRELOAD NUT MEMBER

[75] Inventors: Bernard R. Better; Edward Hain, both of Chicago, Ill.

[73] Assignee: The Bendix Corporation, Southfield, Mich.

[22] Filed: Mar. 23, 1971

[21] Appl. No.: 127,213

[52] U.S. Cl. ......................................74/459, 74/409
[51] Int. Cl. .........................F16h 55/22, F16h 55/18
[58] Field of Search.......74/441, 424.8 A, 409, 89.15

[56] References Cited

UNITED STATES PATENTS

| | | | |
|---|---|---|---|
| 2,643,845 | 6/1953 | Baker | 74/441 X |
| 2,749,812 | 6/1956 | Wetzel | 74/441 X |
| 2,567,483 | 9/1951 | Hotine | 74/441 X |
| 3,023,797 | 3/1962 | Greene | 74/441 X |

*Primary Examiner*—Leonard H. Gerin
*Attorney*—John R. Benefiel and Plante, Hartz, Smith & Thompson

[57] ABSTRACT

An improved method and nut for preloading ball screw assemblies in which the preloading is accomplished by axially offsetting segments of the internal helical grooves of the nut member, the method comprising permanently deforming an intermediate portion of the nut member so as to cause an axial shift of the connected nut member portion and thus result in axially offset helical groove segments in these portions. The nut member is configured to accommodate readily large permanent deformations. This deformation is produced in the specific process described by rolling a peripheral groove into the nut member.

12 Claims, 7 Drawing Figures

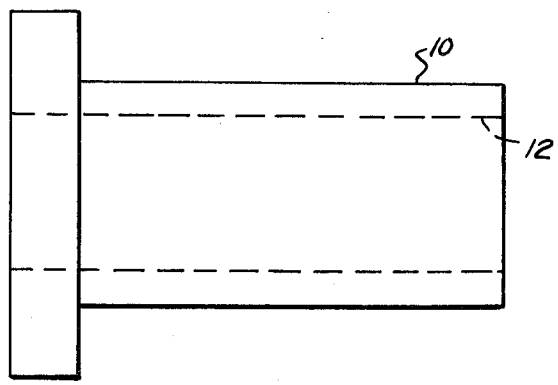
FIG. 1 STEP 1
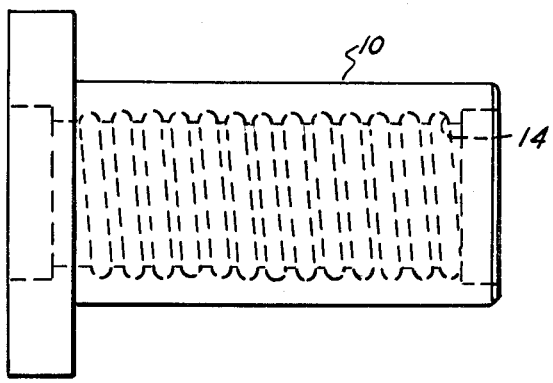
FIG. 2 STEP 2
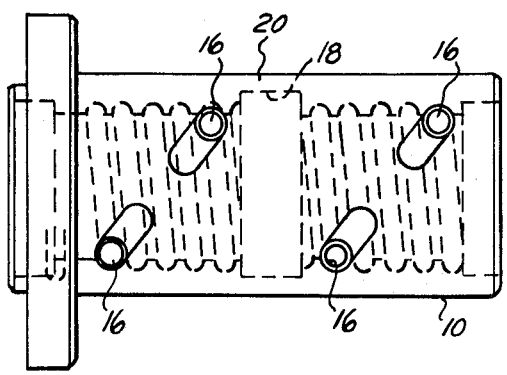
FIG. 3 STEP 3
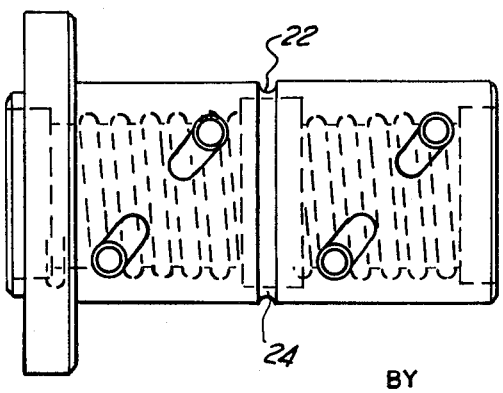
FIG. 4 STEP 4

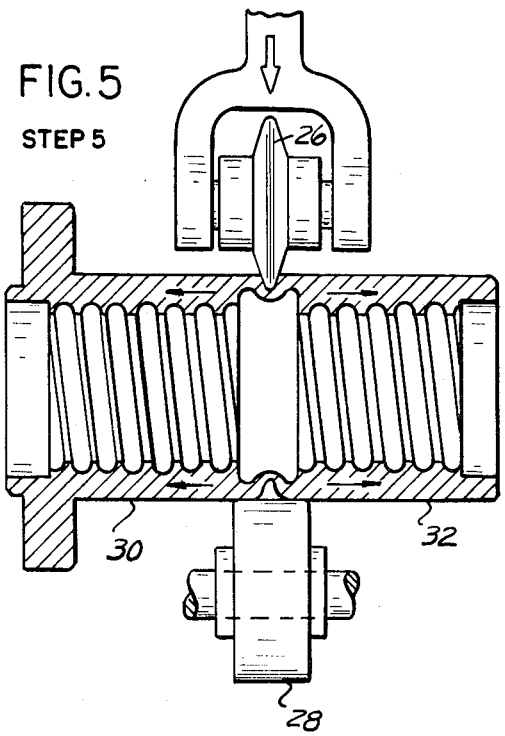
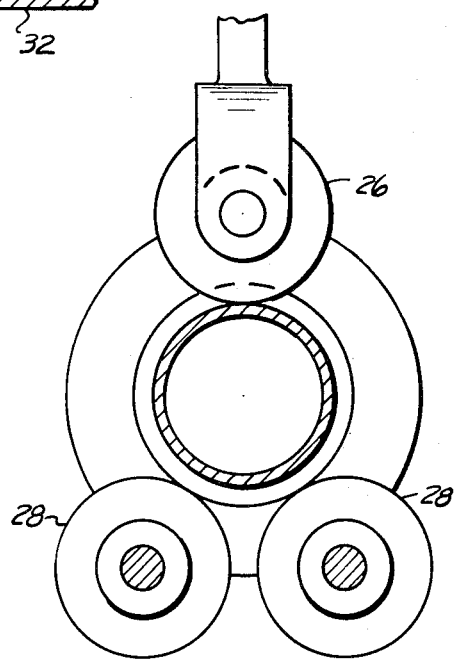
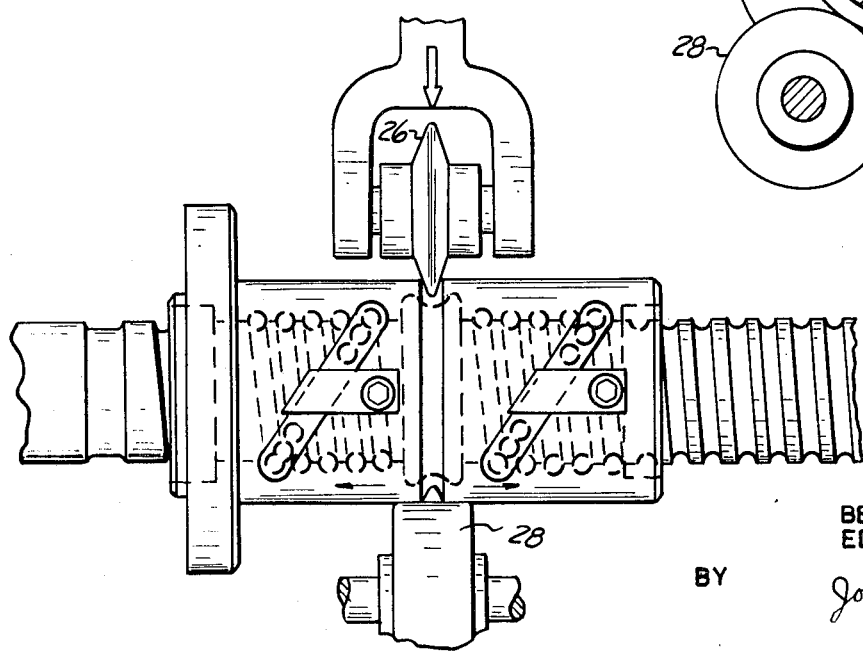

METHOD AND NUT FOR PRELOADING BALL SCREW ASSEMBLIES AND METHOD OF MANUFACTURE OF THE PRELOAD NUT MEMBER

BACKGROUND OF THE INVENTION

1. Field of the Invention

This invention concerns ball screw assemblies and more particularly is concerned with an improved method of preloading ball screw assemblies.

2. Description of the Prior Art

Ball screw assemblies are in widespread use in precision applications, such as in positioning devices for numerically controlled machine tools in which backlash must be at an absolute minimum in either direction of travel, and in which the axial spring rate should be as stiff as practicable.

The most common way of obtaining these results is by "preloading" the nut member, an approach which is very well known in the art. Preloading consists of axially offsetting helical ball groove turns in the nut member relative each other and with respect to the screw member so that the balls tend to engage opposite groove walls in the respective groove turns to thus eliminate backlash and stiffen the spring rate of the assembly (since more balls must be deflected at any moment, but primarily since the spring rate of a ball screw assembly characteristically rises sharply over a certain level of axial loading).

This axial offsetting has been accomplished basically in two ways:

(1) Grinding the nut helical groove so that lead of some or a group of turns is offset from others to thus cause the balls to ramp up on the offset thread turns. This approach has the advantage of relatively low cost over other approaches, but inasmuch as it is usually desirable to adjust the preload level for particular applications or to compensate for loss of preload through wear, this approach has the disadvantage of being difficult to service since these devices must be disassembled and different sets of balls installed. For this same reason, the adjusted preload level is not easily controlled with any degree of precision. In addition, control of the contact angle is lost in using this method of adjustment which can in turn lead to reduced efficiency and load capacity.

Furthermore, the forming of the grooves in two steps may be required, i.e., the offset helical grooves are formed in two separate forming stages and this renders difficult the matching of the geometry of the two sets of grooves so formed which is desirable for maximum smoothness and to minimize differences in forward and reverse drag torques.

Alternatively, relatively complex single pass machining set ups and techniques are needed which do not alleviate the problems described above.

(2) Use of double nuts which have helical groove forms axially offset from each other to create the preload. The nuts are usually adjustable axially with respect to each other to thus provide for convenient adjustment of the preload level, but the use of two nuts creates high manufacturing costs since close tolerance machining is necessary in order to match groove geometry (as each nut is machined separately) as well as concentricity, squareness of the abutting faces, etc., or else compensating devices must be used. In addition, the nuts must be accurately located by dowelling, etc., during assembly, and even then the nuts may shift radially with respect to each other under loading.

Thus it is an object of the present invention to provide an arrangement for preloading ball screw assemblies without requiring excessive manufacturing costs, and/or difficulties in servicing, or resulting in detrimental performance.

It is a further object to provide a method of manufacturing a nut for preload ball screw assemblies which yields maximum smoothness and uniformity of performance, but does not require close tolerance machining processes.

SUMMARY OF THE INVENTION

These objects and others which will become apparent upon a reading of the following specification and claims is accomplished by permanently deforming an intermediate portion of the nut member so as to cause an axial shift of the connected nut portions and an offsetting of the helical groove form segments therein. In the specific process described, this permanent deformation is created by rolling a peripheral groove into the intermediate nut portion.

BRIEF DESCRIPTION OF THE DRAWINGS

FIGS. 1–5 are representations of a nut member undergoing the various steps of manufacture according to the method of the present invention.

FIG. 6 shows the nut member in section undergoing the rolling operation depicted in FIG. 5.

FIG. 7 depicts a complete ball screw assembly undergoing a preloading operation according to the present invention.

DETAILED DESCRIPTION

In the following detailed description, certain specific terminology will be utilized and a specific embodiment will be described in order to provide a full and complete understanding of the invention, but it is to be understood that the invention is not to be so limited, as many variations are possible without departing from the spirit of the present invention.

Referring to the drawing and particularly to FIGS. 1–5, a process of manufacturing a ball screw nut is depicted which incorporates the principle of the present invention. In step 1, a nut blank 10 is roughed out having an internal bore 12 formed therein.

In step 2, the internal helical groove form 14 is formed as by conventional tapping, single point thread chasing or rough grinding processes, but preferably with a final, continuous machined pass as by a finish grind to insure maximum uniformity of all segments of the groove form 14 through the length of the nut blank 10.

In step 3, the rest of the nut geometry is machined into the blank 10 such as O.D., ball return openings 16, etc. In addition, a peripheral interior undercut 18 is formed in an intermediate portion of the nut 10, producing a circumferential section of reduced thickness 20, alternatively, or in addition to this interior undercut, an external recess (not shown) could be utilized to obtain the desired thickness.

In step 4, a guiding groove 22 is formed about the exterior periphery in the section 20 to yield a section 24 of still further reduced thickness. This guide groove 22 could be located in the periphery or the optional external recess noted above.

In step 5, the deforming step according to the present invention is performed. In this step, a wedge-shaped forming wheel 26 shaped complementarily to the guide groove 22 is rotated in the guide groove 22 while being advanced gradually radially inward as indicated, and while the nut 10 is held thereagainst by means of a pair of rollers 28 (FIG. 2). This results in an inward permanent deformation of the section 24 as shown, which in turn, it has been found, results in relative axial shifting of the nut member portions 30 and 32 connected by these sections to produce the axially offsetting of the internal groove form of nut portions 30 and 32.

The extent of axial shifting is, within limits, increased by further inward deformation of the intermediate portion until the desired offset is attained with the undercut 18 allowing relatively great inward deformation.

Upon assembly of the ball screw, the offset internal helical groove turns create a fixed preload interference with the balls.

To accomplish the rolling operation described in step 5, a conventional pipe cutter may be modified by substituting the wedge-shaped wheel 26 for the cutting wheel to conveniently provide a simple tool for this purpose, while a pair of cylindrical support rollers 28 will minimize any build-up of material around the edges of the groove 22.

Once the desired preload has been attained and adjustments in the field desired or to compensate for loss, this can be accomplished by replacing the balls with those of a greater diameter, in the conventional manner, or the unit may be disassembled and the nut again deformed in the described manner.

Conversely, a uniform endwise pressure could be applied to the nut to lessen the offset and thus the preload.

As an alternative, the deformation process may be carried out with the unit assembled as depicted in FIG. 3, rolling the intermediate section until the desired preload level has been attained.

It should be noted that inasmuch as the intermediate section must transmit the axial forces in certain loading situations, this section should be sized so as to be relatively stiff with respect to the stiffness of the ball-nut combination so that the overall stiffness of the assembly is not compromised.

It can readily be appreciated that this method provides an extremely simple and convenient means for creating the preload without the aforesaid disadvantages experienced in prior art approaches.

In typical situations, axial displacements up to 0.023 inches were attained without distortion or loss of trueness of the connected nut portions, without loss of parallelism of the connected nut portion faces, and since the deformation is limited to the intermediate section, no distortion of groove geometry is incurred by the operation.

It should be noted that there are many alternative methods for accomplishing the deformation of the intermediate portion such as the use of swaging equipment. Furthermore, the nut configuration utilizing the undercut and the guide groove while providing the desirable advantages of increased precision and extent of travel in the axial offset movement may be varied or omitted. In connection with this, axial displacements on the order of 0.006 inch were attained without the undercut configuration.

What is claimed is:

1. A method of axially offsetting portions of a helically grooved member comprising:
   permanently deforming an intermediate section of said member so as to cause a relative axial shift in position of said grooved portions.

2. The method of claim 1 wherein in said deforming step said member is permanently deformed radially inwardly about its periphery at said intermediate section.

3. A method of preloading a ball screw assembly having a screw member, a nut member and a plurality of recirculating balls comprising the step of permanently deforming an intermediate section of said nut so as to cause a relative axial shift in position of the nut portions connected thereby sufficient to preload said balls in said ball screw assembly.

4. The method of claim 3 wherein said section is permanently deformed radially inwardly about its periphery.

5. The method of claim 4 wherein said deforming step is carried by rolling said section.

6. The method of claim 3 wherein said section of said nut is permanently deformed prior to assembly of said ball screw.

7. The method of claim 3 wherein said ball screw is assembled with said recirculating balls in place prior to permanently deforming said nut section.

8. A nut comprising a member having an internally helically grooved bore therethrough and an intermediate recess extending about the bore and separating the bore into two portions, and further including an external groove formed about said member aligned with said recess, whereby said nut member may be permanently deformed radially inwardly to cause axial shifting of said portions.

9. A method of manufacturing a nut member which has aligned internally helically grooved portions axially offset from each other comprising the steps of:
   forming a helical groove through a bore in said nut member;
   permanently deforming said nut member radially inwardly about its periphery at a section intermediate said helical groove, whereby portions of said helical groove connected by said section are axially offset from each other.

10. The method of claim 9 wherein said deforming step is carried out by rolling a groove in the periphery of said nut member.

11. The method of claim 10 wherein prior to said rolling step an exterior groove is machined said member about the periphery of said intermediate section to guide said rolling operation.

12. The method of claim 9 wherein prior to deforming said section an undercut is formed in said bore at said intermediate section.

* * * * *